United States Patent [19]

White

[11] 4,346,305
[45] Aug. 24, 1982

[54] GOVERNOR FOR FLUID CURRENT MOTOR
[76] Inventor: Forest B. White, Bison, S. Dak. 57620
[21] Appl. No.: 24,324
[22] Filed: Mar. 27, 1979

Related U.S. Application Data

[63] Continuation-in-part of Ser. No. 746,012, Nov. 30, 1976, abandoned.

[51] Int. Cl.³ .......................... F03D 3/00; F03D 7/04
[52] U.S. Cl. .................................... 290/55; 416/143; 416/153
[58] Field of Search ................................. 290/42–44, 290/53–55; 416/111, 117, 119, 114, 115, 118, 140 R, 153, 142 B, 143

[56] References Cited

U.S. PATENT DOCUMENTS

| | | | |
|---|---|---|---|
| 232,205 | 9/1880 | Preston | 416/111 |
| 665,810 | 1/1901 | Stretch | 290/55 |
| 1,524,712 | 2/1925 | Hurd | 416/140 |
| 1,542,433 | 6/1925 | Zgliczynski | 416/111 X |
| 1,626,314 | 4/1927 | Tuckey | 416/118 |
| 2,107,690 | 2/1938 | Clark | 416/119 |
| 3,442,492 | 5/1969 | Sullivan | 416/85 |
| 3,546,473 | 12/1970 | Rich | 290/53 X |
| 3,604,942 | 9/1971 | Nelson | 290/54 |
| 3,912,937 | 10/1975 | Lesser | 290/43 |
| 4,031,173 | 6/1977 | Rogers | 290/55 |
| 4,052,134 | 10/1977 | Rumsey | 416/119 |
| 4,114,046 | 9/1978 | Yousef | 290/55 |

FOREIGN PATENT DOCUMENTS

| | | | |
|---|---|---|---|
| 105536 | 9/1926 | Fed. Rep. of Germany | 290/55 |
| 2252769 | 6/1975 | France | 416/111 |

*Primary Examiner*—J. V. Truhe
*Assistant Examiner*—Shelley Wade
*Attorney, Agent, or Firm*—Harvey B. Jacobson

[57] ABSTRACT

A fluid current motor having at least one vane mounted on a support for being moved by a fluid current. Flappers are pivotally mounted on the vane for orbital movement and are stopped from movement when moving with the fluid current and swing parallel to the direction of flow of the fluid current when moving against the fluid current. A governor system is further provided to regulate the speed of operation of the vane assembly, and to essentially shut off the motor in excessively strong fluid currents, thereby preventing damage to the fluid current motor. Electricity can be generated directly by the movement of the vane through use of a linear induction system.

13 Claims, 25 Drawing Figures

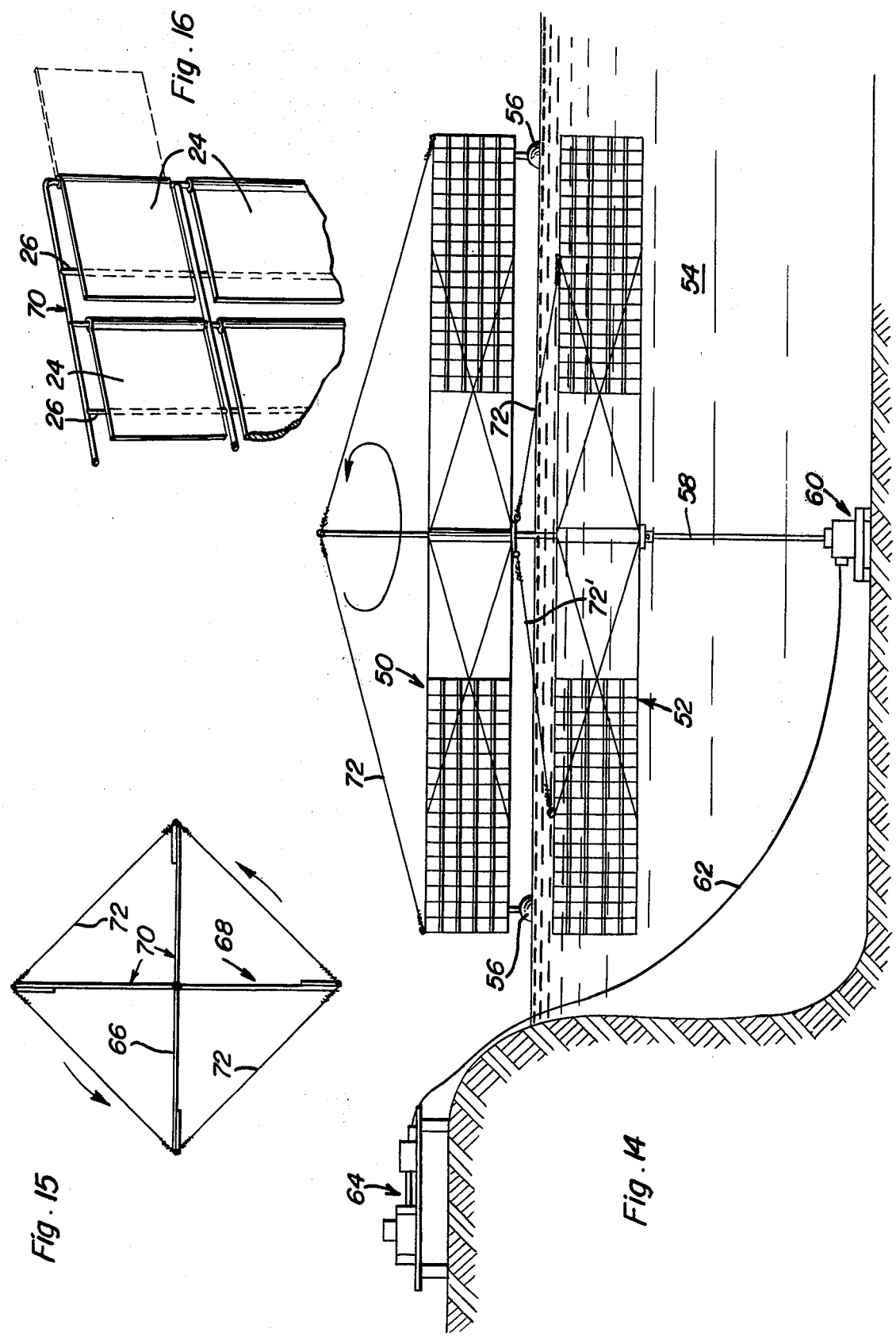

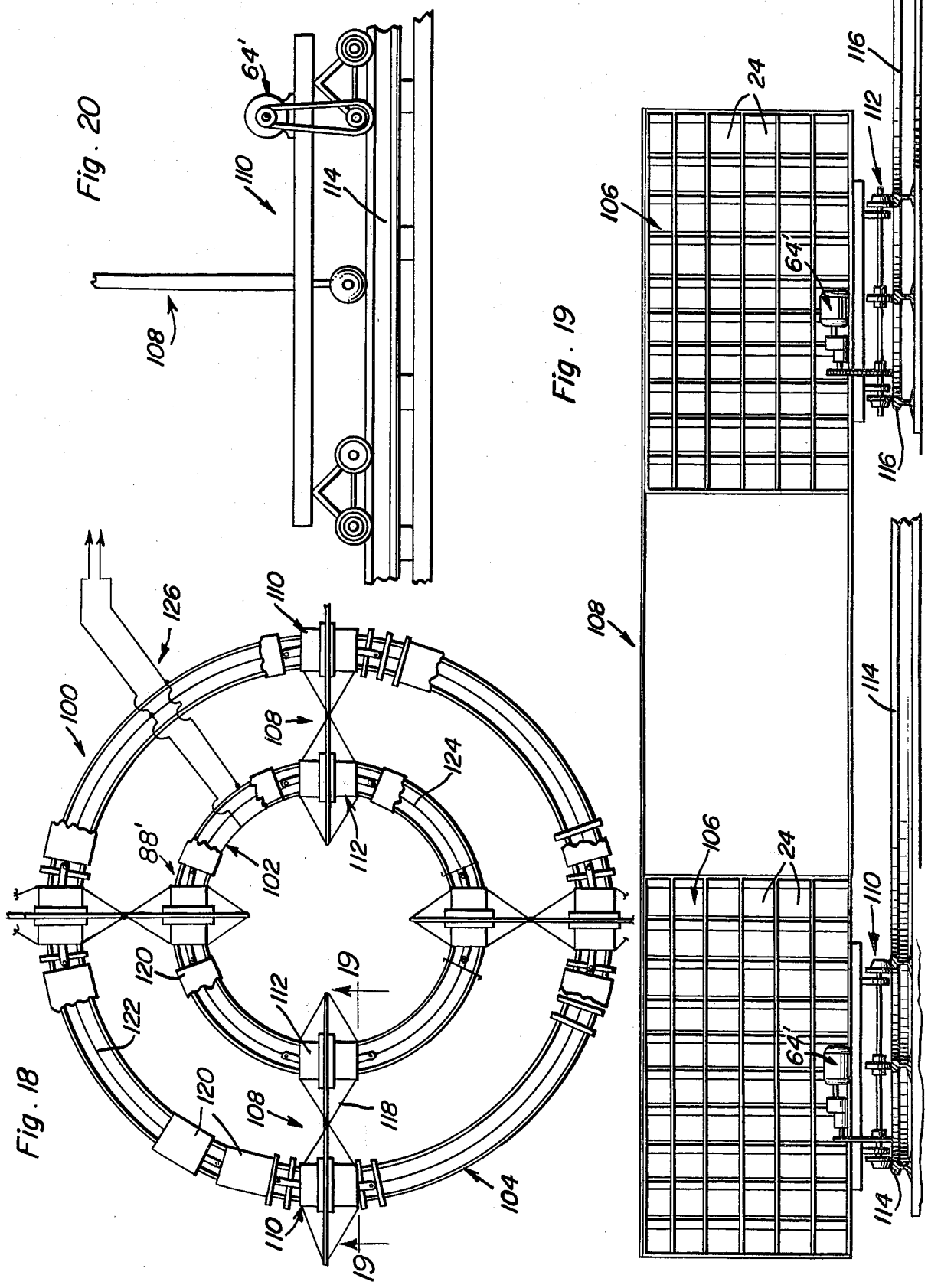

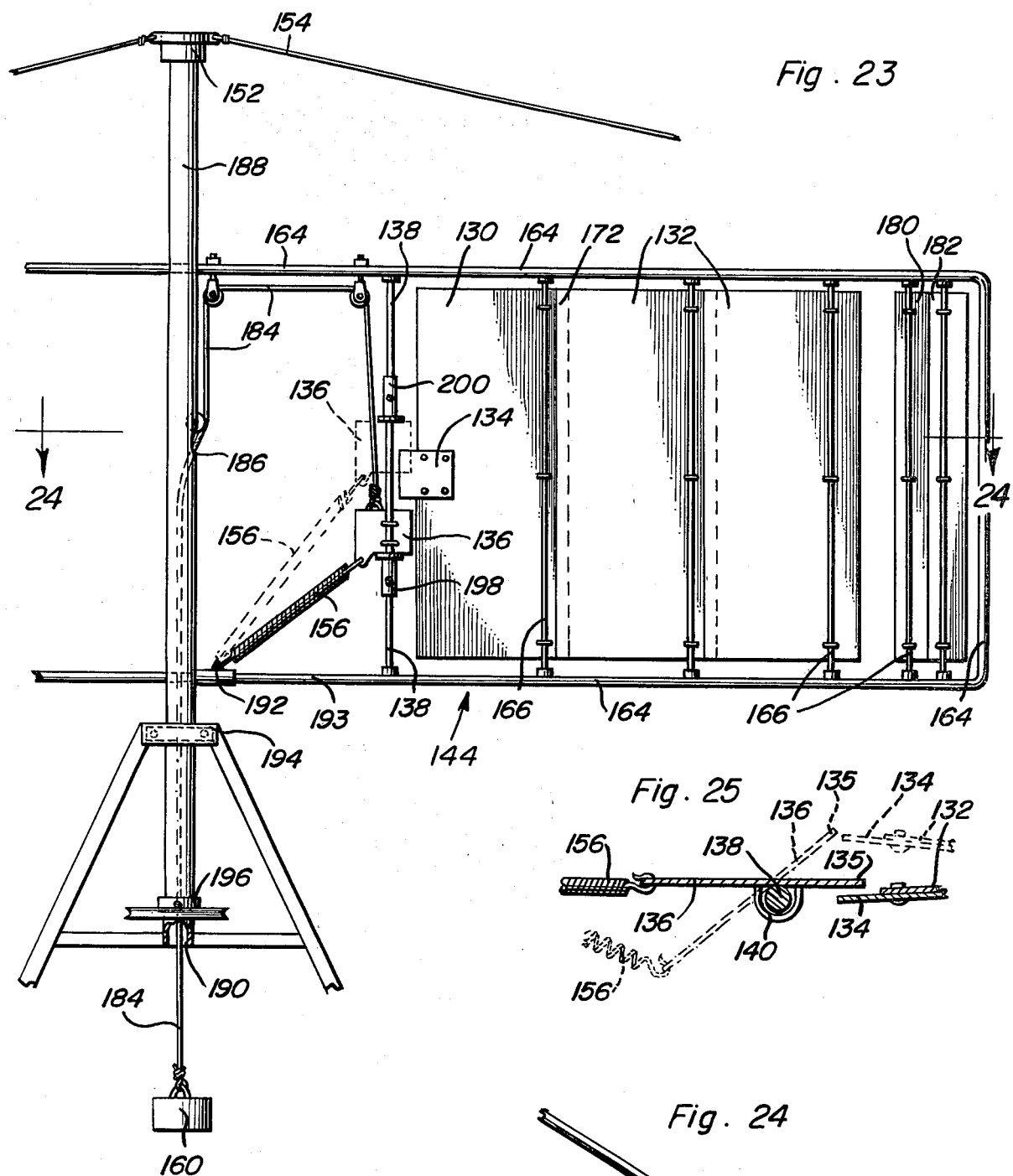
Fig. 23
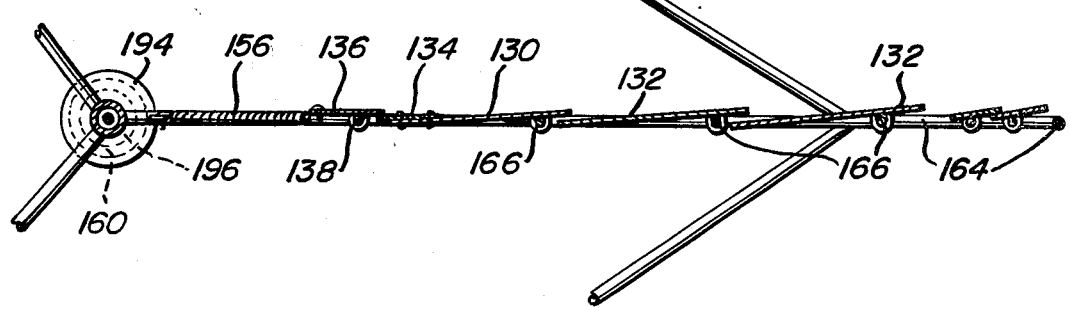
Fig. 24
Fig. 25

GOVERNOR FOR FLUID CURRENT MOTOR

CROSS-REFERENCE TO RELATED APPLICATION

This is a continuation-in-part of my copending patent application Ser. No. 746,012, filed Nov. 30, 1976.

BACKGROUND OF THE INVENTION

1. Field of the Invention

The present invention relates generally to a fluid current motor, and particularly to a fluid current motor which can be used in both gaseous and liquid mediums, or both simultaneously, in order to convert energy present in the fluid current into mechanical or electrical energy useful for various industrial and commercial purposes. A governor system controls excessively high speeds of operation and protects the motor in excessively strong fluid currents.

2. Disclosure Statement

It is generally known to construct windmills which include a plurality of pivotally mounted flappers for causing rotation of the mill. Examples of such windmills can be found in U.S. Pat. No. 2,003, issued Mar. 12, 1841, to J. M. Van Osdel, U.S. Pat. No. 641,143, issued Jan. 9, 1900, to J. O'Toole, U.S. Pat. No. 961,766, issued June 21, 1910, to T. H. E. Folger, 987,645, issued Mar. 21, 1911, to J. O'Toole, and U.S. Pat. No. 3,912,937, issued Oct. 14, 1975, to J. M. Lesser. In particular, U.S. Pat. No. 3,912,937 discloses an electrical energy generating apparatus that can be employed with water as well as with air, and also shows the use of pivotal louvers on legs of a triangular-shaped vane.

It is an object of the present invention to provide a fluid current motor capable of operation in either a gaseous or liquid medium.

It is another object of the present invention to provide a fluid current motor of simple, yet rugged and reliable, construction.

It is a further object to provide energy for useful purposes from a source of power other than fossil fuels.

It is still another object of the present invention to provide a fluid current motor which can generate electricity directly by rotation of a moving part of the motor.

Yet another object is to enable the fluid current motor to withstand even excessively strong fluid currents by providing a governor system which stops or severely limits the rotation in such currents.

These and other objects are achieved according to the present invention providing a fluid current motor having a vane mounted for movement in a fluid current and a support mounting the vane for movement of the vane relative to the support under the influence of the fluid current. The support orients the vane for movement in a substantially horizontal plane. A governor system can optionally be installed to limit vane movement in an excessively strong fluid current.

According to one preferred embodiment of the invention, the vane includes a framework in the shape of an equilateral triangle in plan so as to have three equal angles and sides, and is mounted for rotation at a juncture of bisections of the angles of the triangle. A plurality of flappers are pivotally mounted on the framework along the bisections thereof so as to orbit about the support.

The vane also includes stops provided along the bisection of the angles of the triangle forming the framework for limiting pivotal movement of the flappers when same are moving with the fluid current, while permitting the flappers to swing parallel to the fluid current when moving against the current. By this arrangement, it will be appreciated that rotational or orbiting movements of the flappers can be achieved in order to cause the vane to move within the fluid current.

Advantageously, there are a plurality of vanes mounted on the support and arranged in different phases from one another, with at least two different phases, in order to provide for a smoother operation of the motor. In addition, at least one of the plurality of vanes can be submerged in a liquid current, while at least one other of the vanes floats on the liquid.

According to another preferred embodiment of constructing a vane according to the invention, the vane includes a pair of perpendicularly disposed, crossed blades each having a pair of arms provided with at least one flapper and with a stop associated with the flapper. The vanes are slidably connected to a shaft which extends toward the bottom of the body of liquid with which the vanes are associated and has connected at the lower end thereof a fluid pump for creating a fluid pressure in order to actuate a motor-generator system, and the like.

According to yet another embodiment of the invention, the support includes an enclosed track, and the vane includes a plurality of blades mounted in spaced relation on the track for movement therealong. The track preferably forms a circular path along a band about the periphery of a sphere, such as a balloon which elevates the motor to a predetermined height in order to take advantage of wind currents that vary with altitude.

According to still another preferred embodiment of the invention, a track lies in a substantially horizontal plane and includes concentric inner and outer track portions. The blades of an associated vane are mounted on and extend between the track portions for great stability, and can be connected together around the concentric track portions to form endless trains of vanes. In addition, dummy cars can be inserted between the vanes in order to decrease the number of vanes employed in such a train, and also to function as pick-up vehicles for a linear induction electrical generating system which can be associated with the track of any of the track-based embodiments of the invention.

In any of the embodiments described, the vanes are preferably provided with a governor system comprising vane control stops and control means responsive to the speed of the fluid current for disengaging the control stops when the speed of fluid current exceeds a predetermined value or causes the fluid current motor to move at a speed which exceeds a predetermined limit. Disengagement of the control stops slows the framework motion so as to protect the fluid current motor from excessive wind speeds or water moving too rapidly.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 14 is a schematic, vertical sectional view showing a second embodiment of a fluid current motor according to the present invention.

FIG. 15 is a schematic, top end view showing the construction of a vane used with the embodiment of the invention shown in FIG. 14.

FIG. 16 is a fragmentary, perspective view showing a detail of a bank of flappers used with a blade partially forming the vanes of the embodiment of the invention shown in FIGS. 14 and 15.

FIG. 18 is a schematic, top plan view showing a still further embodiment of the invention.

FIG. 19 is an enlarged, fragmentary, sectional view of the embodiment of FIG. 18, taken substantially upon a plane passing along section line 19—19 on FIG. 18.

FIG. 20 is an enlarged, fragmentary, side elevational view of the embodiment of the invention shown in FIGS. 18 and 19.

FIG. 23 is a side elevational view of a second form of fluid current motor and associated governor.

FIG. 24 is a sectional view of the device of FIG. 23, taken substantially upon a plane passing along section line 24—24 on FIG. 23.

FIG. 25 is a sectional view of the control stop mechanism of FIG. 21 or FIG. 23.

DESCRIPTION OF THE PREFERRED EMBODIMENTS

Because events in recent years have precipitated concern that greater world-wide demand for energy than available supplies may be creating a world-wide energy shortage, alternative sources of power have been reexamined with a view toward alleviating any present or prospective shortages. Although some of the elements of the present invention have appeared in the art, the particular combination of elements herein disclosed, resulting in the advantages of the structures taught and claimed herein, are not described. In general, previous approaches have relied upon constructions not controllable in the manner taught according to the present invention.

Figure 1:
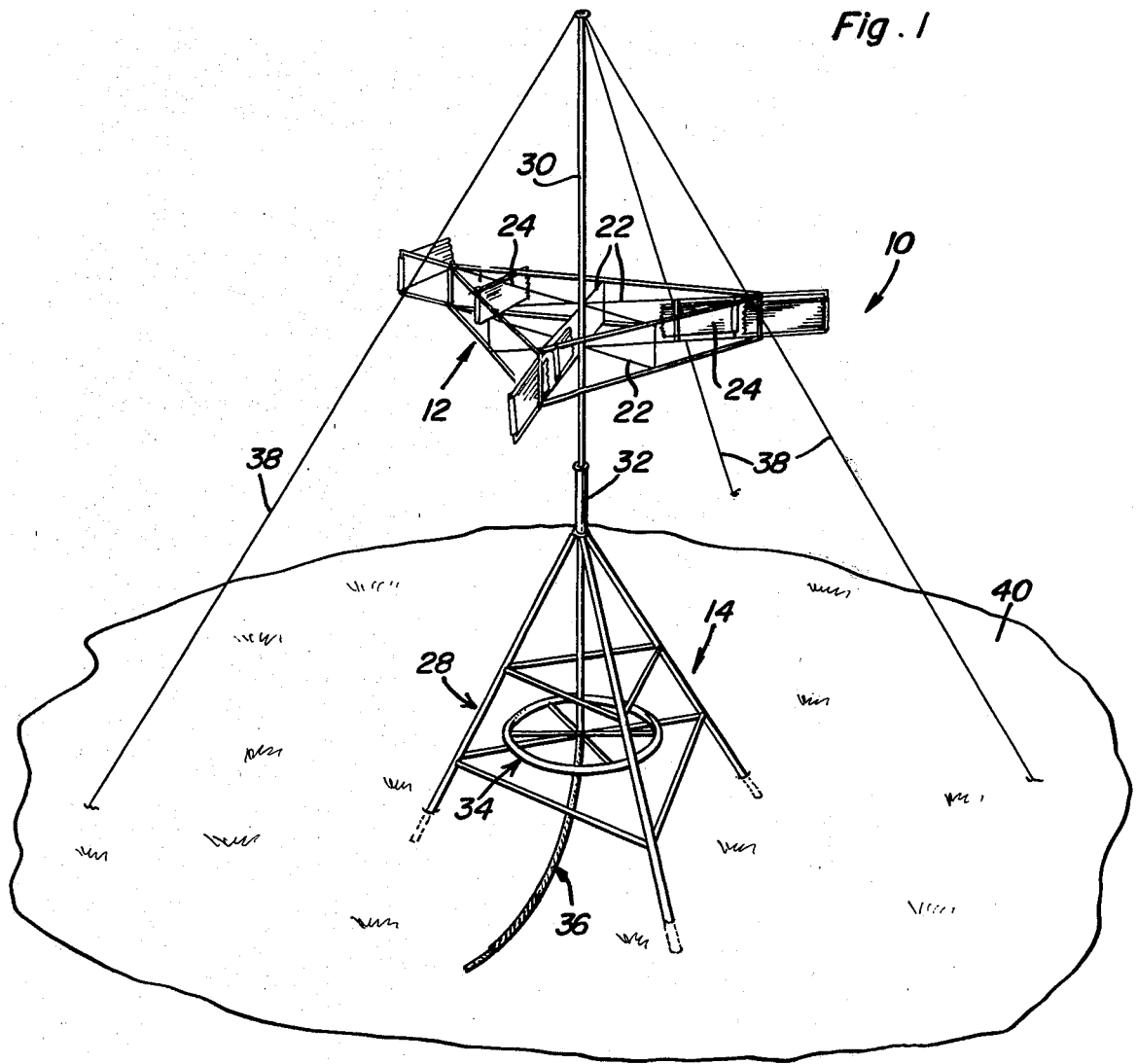
FIG. 1 is a schematic, perspective view showing a first embodiment of a fluid current motor according to the present invention.
Figure 2:
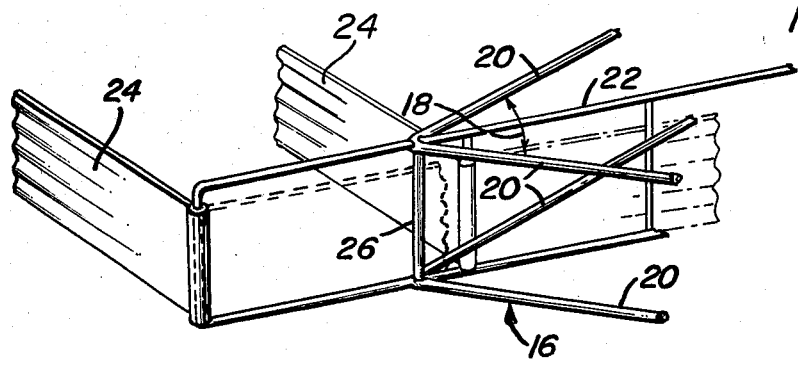
FIG. 2 is an enlarged, fragmentary, perspective view showing a detail of the vane of the embodiment of the invention shown in FIG. 1.

Referring now more particularly to FIGS. 1 and 2 of the drawings, a fluid current motor 10 according to the present invention includes a vane 12 mounted on a support 14 for movement in a fluid current. More specifically, vane 12 is mounted on support 14 for rotational movement relative to support 14 by action of a wind current on vane 12. The support 14 orients vane 12 for rotational movement in a substantially horizontal plane.

Vane 12 includes a framework 16 in the shape of an equilateral triangle in plan and having three equal angles 18 and three equal sides 20 extending between and forming the angles 18. As can be seen from the drawings, framework 16 can be three-dimensional by a duplication of the equilateral triangle and suitable connecting members. Three loops 22, each comprising a pair of spaced rail members are arranged extending from the apexes of angles 18 so as to bisect the angles 18 and cross one another at a juncture of the bisections of the angles 18 of the triangle forming framework 16. A plurality of flappers 24, as illustrated two per loop 22, are pivotally mounted on the loops 22 so as to be arranged along the bisections of the angles 18. As can be readily appreciated from the drawings, the flappers 24 are so arranged as to orbit about the support 14 as vane 12 rotates.

Vane 12 further includes a pair of stops 26 provided on each loop 22 so as to extend across the upper and lower runs of same in order to limit pivotal movement of flappers 24. More specifically, when flappers 24 are moving with the field current, the stops 26 will prevent flappers 24 from moving out of a position substantially transverse of the direction of fluid flow, while when the flappers 24 are moving against the direction of flow of the fluid current, the stops 26 will permit the flappers 24 to swing into a position substantially parallel to the fluid current.

Support 14 includes a stand 28 of conventional tripod construction and supporting thereon a substantially vertically oriented shaft 30. The latter is journaled on stand 28 as by a sleeve bearing 32 and has connected at the lower end thereof a flywheel 34 and a transmission cable 36 for permitting the shaft 30 to be connected to a suitable load (not shown) such as an electrical generator. Guy wires 38 extending from the uppermost end of shaft 30 to a surface 40 supporting motor 10 help stabilize the structure. The vane 12 is mounted on shaft 30 for rotating same in order to convert the energy of the wind impinging on flappers 24 into a rotating mechanical output.

FIGS. 3-11 of the drawings show the positions of the flappers 24 for various stages in an operating cycle of a vane 12. The large flow arrows in each of the figures indicate the direction of fluid current flow in each instance. Due to the presence of the stops 26, the direction of rotation of vane 12 will always be the same, and in the illustrated embodiment is counterclockwise as indicated by the smaller direction arrows associated with each of the FIGS. 3-11.

Figure 12:
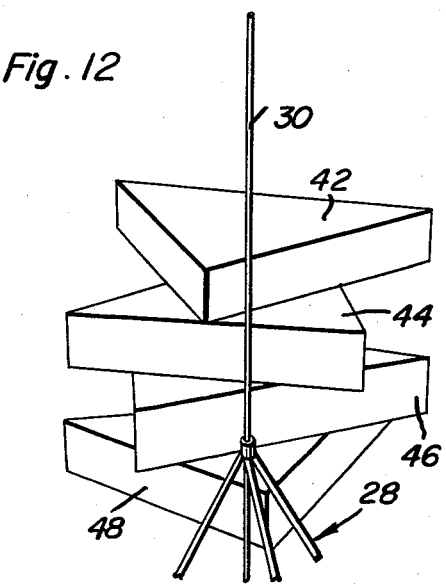
FIG. 12 is a schematic, perspective view showing an embodiment of the invention similar to that shown in FIGS. 1 and 2, but including a plurality of vanes.
Figure 13:
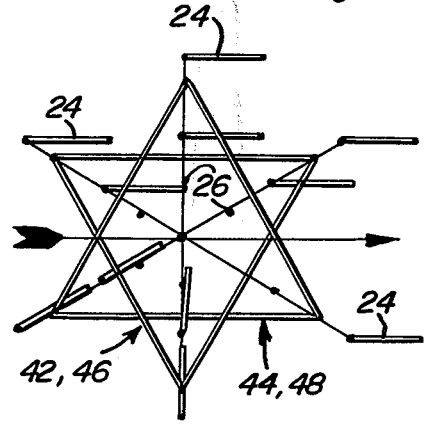
FIG. 13 is a schematic, top plan view similar to FIGS. 3-11, but showing one stage in an operating cycle of the embodiment of the invention shown in FIG. 12.

Referring now more particularly to FIGS. 12 and 13 of the drawings, an embodiment is shown which includes a plurality of vanes 42, 44, 46 and 48, each similar to vane 12, and mounted one above the other on the shaft 14 of a support which may be essentially the same as support 14. The vanes 42, 44, 46 and 48 are disposed in at least two different phases in order to provide for a larger period of power application to motor 10 during each revolution of shaft 30, and as illustrated the vanes are grouped in two phases with vanes 42 and 46 in one phase and vanes 44 and 48 in the other phase.

FIGS. 14–16 of the drawings disclose a further embodiment of the invention wherein a pair of vanes 50 and 52 are disposed in vertical relationship such that vane 52 is submerged in a current formed in a body of a suitable liquid 54, which is preferably water, and vane 50 floats on the surface of liquid 54 preferably with the help of suitable floats 56 constructed from a conventional buoyant material. Vanes 50 and 52 are slidably mounted on a shaft 58 which is vertically disposed in liquid 54, such that vanes 50 and 52 are keyed or splined to the associated shaft 58 for rotation therewith while being permitted sliding movement along the shaft to compensate for variations in the surface level of liquid 54 due to changing tides, and the like. Mounted at the lower end of shaft 58 is a conventional fluid pump 60 having connected thereto a line or lines 62 which causes the fluid flow generated by pump 60 to actuate a conventional fluid motor and electrical generator set 64 disposed on the bank, shore or other surface adjoining the cavity in which liquid 54 is disposed.

Each of vanes 50 and 52 includes a pair of perpendicularly disposed crossed blades 66 and 68, each of which blades has a pair of arms 70 provided with at least one, and preferably the illustrated plurality, of flappers 24. Stops similar to stops 26 are associated with the banks of flappers 24 so as to cooperate with the flappers 24 in the identical manner as set forth for vanes 12 described above. Wires 72 and 72' are disposed extending between the arms 70 and shaft 58 in order to rigidify the blades 66 and 68 as is appropriate and necessary.

As can be readily understood, the fluid current set up in liquid 54, which may be considered as being perpendicular to the plane of FIG. 14, will cause vane 52 to rotate about shaft 58 in the identical manner that a current of air will cause vane 50 to similarly rotate. Thus, gaseous and liquid currents can be used simultaneously by the arrangement set forth in FIGS. 14–16. The manipulation of flappers 24 which causes the vanes 50 and 52 to rotate is identical to the action of the like flappers which causes rotation of vane 12 as described above.

Vanes 50, 52 can assume other forms than than shown, including triangular in the manner of vane 12, and also can be multiple above and below the liquid surface.

Figure 17:
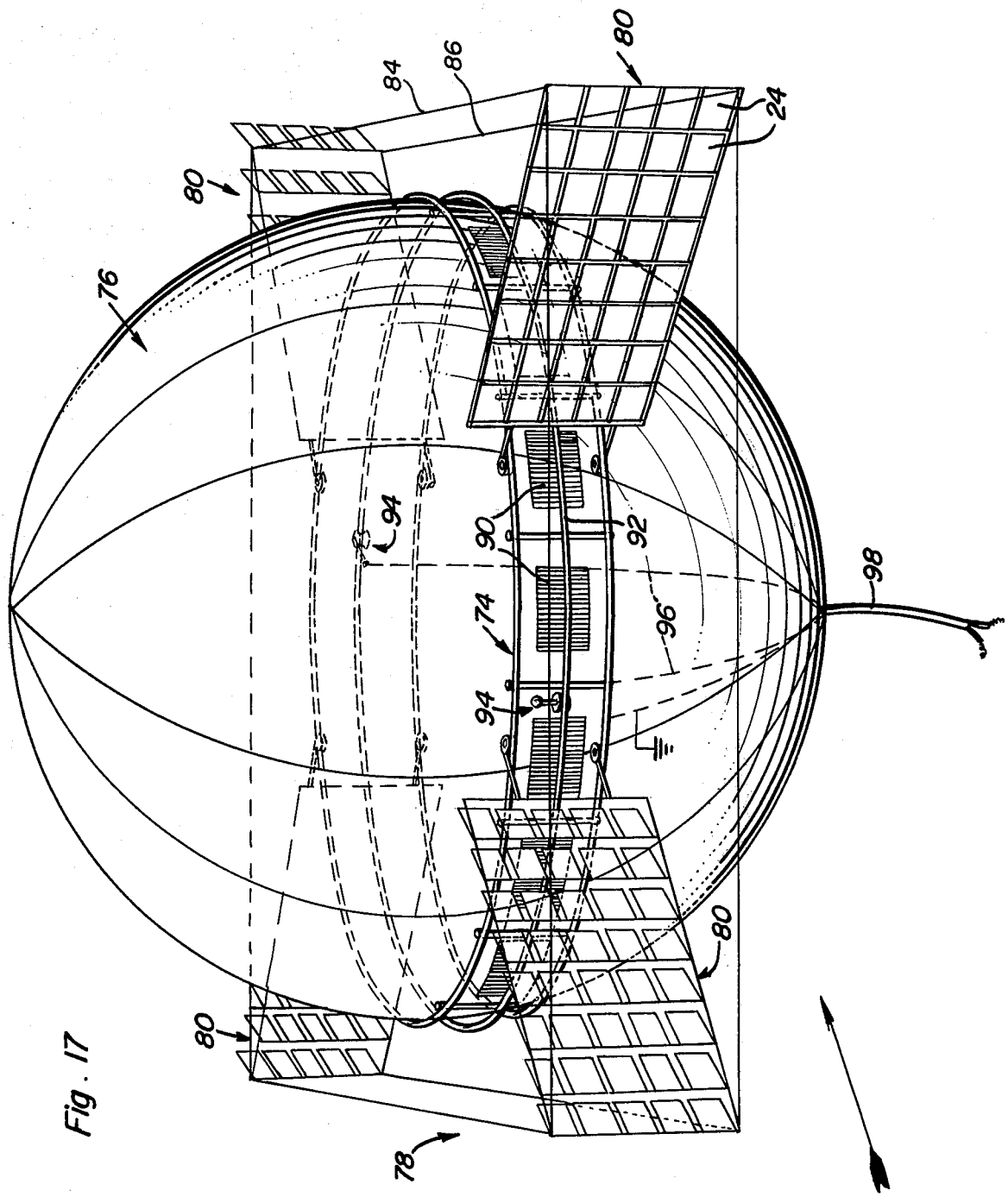
FIG. 17 is a schematic, perspective view showing yet another embodiment of the invention.

Referring now to FIG. 17 of the drawings, a support in the form of an enclosed track 74 is shown as forming a circular path along a band about the periphery of a sphere preferably in the form of the illustrated balloon 76. A vane 78 associated with track 74 includes a plurality of blades 80 mounted in spaced relation on track 74 for movement therealong as by the use of conventional trolleys 82. Wires 84 and 86 extend between the outermost ends of the radially extending blades 80 in order to tie together the blades 80 and rigidify as well as unify the vane 78. The pair of spaced, parallel rails 75 and 75' forming track 74 are tied together and attached to the surface of balloon 76 as by the illustrated tie bars 77 so as to be spaced from the surface of balloon 76, a distance sufficient to permit trolleys 82 to engage the surface of the rails facing the surface of balloon 76.

The embodiment of the invention shown in FIG. 17 further includes a linear induction generator 88 connected to track 74 and vane 78 for converting movement of vane 78 about track 74 directly into electric power. For this purpose, a plurality of permanent magnets 90 are spaced about the surface of balloon 76 in association with track 74, and a conductor 92 is attached to blades 80 and disposed girdling balloon 76 within the confines of the path of the track 74 for being moved relative to magnets 90 by movement of vane 78 in order to generate electrical current. Rollers 94, and the like, are employed as pickups in order to transfer the electrical power thus generated from the conductor 92 to wires 96 which feed into a cable 98 extending from balloon 76 to a predetermined point (not shown) beneath balloon 76. By this arrangement, balloon 76 can take advantage of varying air currents at different heights above the surface of the earth in order to generate electrical power. It also will be appreciated that the power generated by generator 88 can be employed to energize a suitable transmitter, repeaters, and the like, none of which is shown, supported in a conventional manner on balloon 76.

Yet another embodiment of the invention is shown in FIGS. 18–20 of the drawings, wherein a track system 100 lies in a substantially horizontal plane and includes an inner track 102 and an outer track 104 arranged concentrically with respect to one another. Blades or sails 106 cooperate for form a plurality of vanes 108 by being portions of a generally rectangular framework with the sails 106 disposed at longitudinally spaced ends of the framework. The sails 106 themselves are mounted directly on respective trucks 110 and 112 which ride on the respective rails 114 and 116 of tracks 102 and 104 in order to permit the associated vane 108 to move about the track system 100. Wires 118 are advantageously employed as appropriate in order to rigidify vanes 108 on their associated trucks 110 and 112.

Alternatively, a vane (not shown) could be arranged between trucks 110, 112 in addition to or in place of vanes 106.

While vane 108 can be connected to other vanes 108 in sufficient numbers as to form a continuous train of vanes 108 extending about the track system 100, it is advantageous to employ a suitable number of dummy cars 120 between a predetermined number of vanes 108 less the number needed to form such a complete train around system 100. These dummy cars 120 need only be connected to one another and to trucks 110 and 112 on a respective track 102, 104, and need not be connected to a corresponding dummy car 120 on the other of the tracks 104, 102 although such connection may be desirable depending on operating conditions of the device.

Motor-generator set 64' including a mechanical transmission and suitable electrical generator is advantageously provided on the trucks 110 and 112, as well as on dummy cars 120, in order to generate electrical energy directly from the movement of vanes 108 over the track system 100. In addition, a linear induction generator 88', similar to generator 88, may be associated with the track system 100 and vanes 108 as by the use of suitable magnets (not shown) and conductors 122 and 124 mounted on and extending between the vanes 108 and 110 so as to pass over the magnets as a function of the movement of vanes 108 about the track system 100. An appropriate pickup system 126 is employed to take the electrical power thus generated away from the inductors 122, 124, and an associated one of the rails 114, 116, for transmission to a suitable distribution point.

In all cases where there is more than one system of vanes on a common base, a clutch or ratchet should be installed to prevent energy loss, because one set of vanes would merely be operating to run the other set. An example would be as in FIGS. 14, 15 and 16 wherein a 30 knot wind flows above sea level and 10 knot current below sea level. The energy from the vanes above sea level would all be expended in running the vanes below sea level without a clutch or ratchet.

As can be readily understood from the above description and from the drawings, fluid current motors according to the present invention provide simple yet rugged and reliable devices for generating useful mechanical and/or electrical power from gaseous and/or liquid fluid currents. All of the embodiments above described can advantageously employ a suitable governor in order to prevent destruction of the motor when the fluid current reaches speeds beyond a certain maximum safe speed determined from the vanes of the motor, with such speed regulation being achieved as by feathering the vanes until proper speed reduction is attained.

Figure 21:
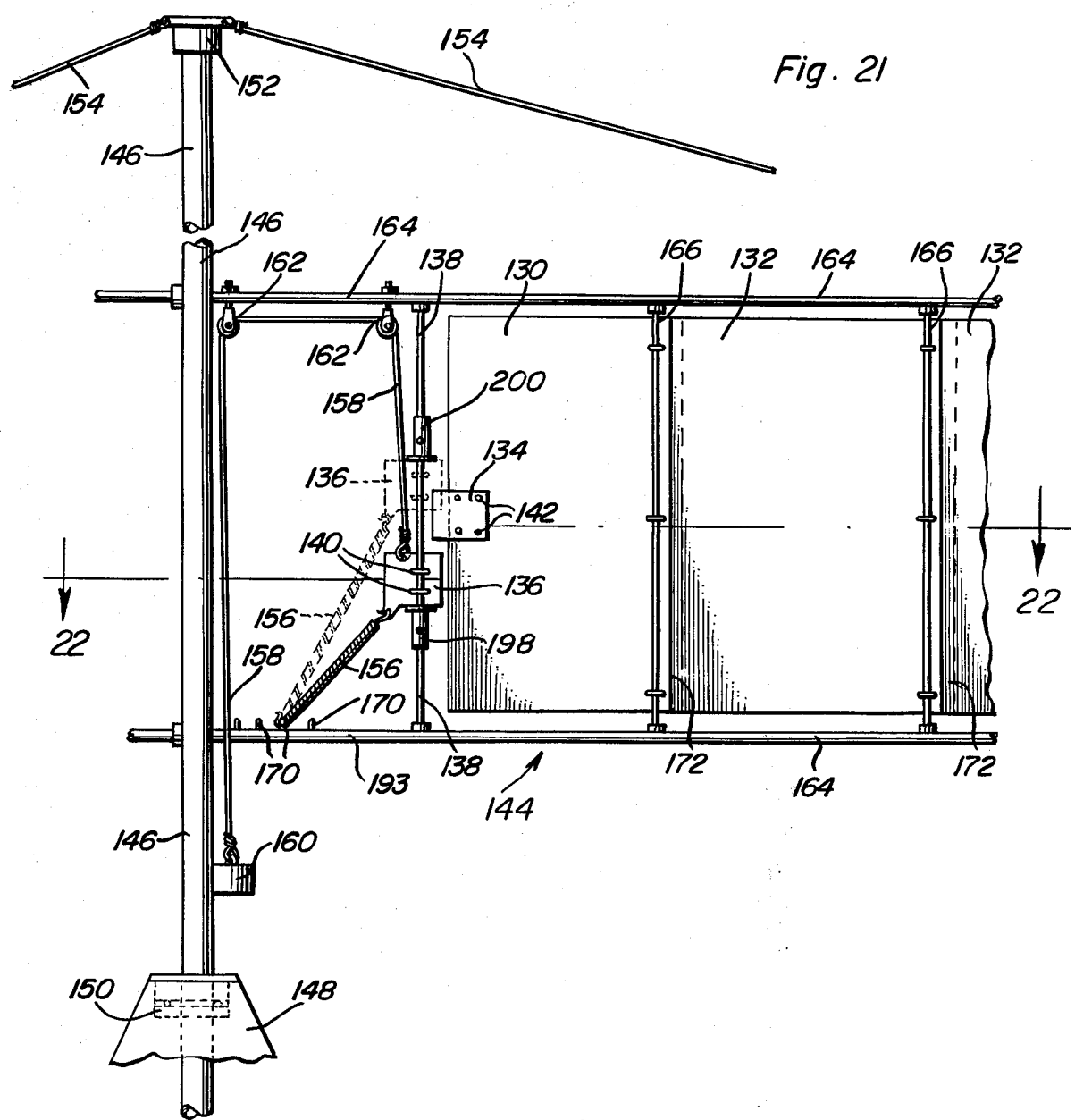
FIG. 21 is a fragmentary side elevational view of an embodiment of a fluid current motor having an associated governor system.
Figure 22:
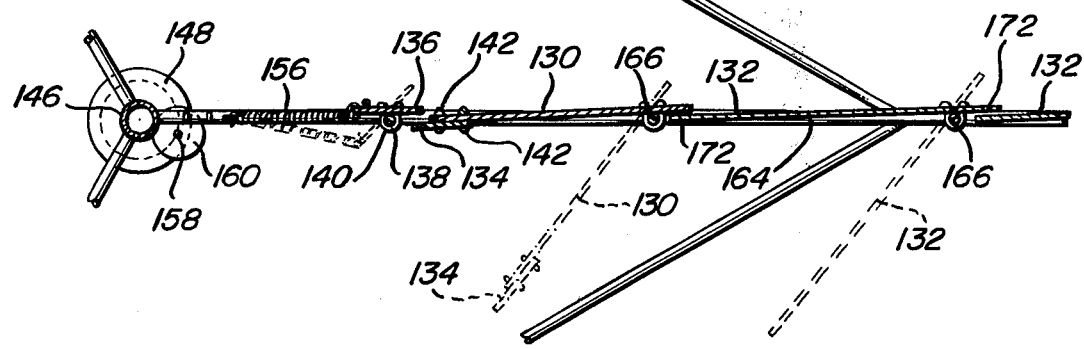
FIG. 22 is a sectional view of the device of FIG. 21, taken substantially upon a plane passing along section line 22—22 on FIG. 21.

The first form of a governor system of the type above contemplated is shown in FIG. 21, showing control vane 130 provided with vane protrusion 134 which projects radially inwardly toward control stop 136, mounted on control rod 138 by brackets 140, in the manner shown in FIG. 21. The position of stop 136 is shown in its lowermost position on rod 138, such as the position when weight 160 is absent or has just been attached to cable 158. When stop 136 passes to its uppermost position on rod 138 (shown in phantom in FIG. 21) under the upward pull of cable 158 due to weight 160, and as opposed by spring 156, protrusion 134 contacts stop 136 to permit framework 144 to begin operation. Protrusion 134 is mounted on control vane 130 by any suitable means, such as riveting, bolting, or the like, as shown in FIGS. 21 and 22 by four appropriately spaced rivets 142. Vanes 130 and 132 are mounted on framework 144, which rotates freely, along with substantially vertically oriented shaft 146, to which it is attached securely, the shaft being journaled on stand 148 as by sleeve bearing 150. Connected at the lower end of shaft 150 is means for permitting shaft 146 to be connected to a suitable load (not shown) such as an electrical generator. Shaft 146 is retained at its upper end by cap 152, which is anchored by guy wires 154 extending from cap 152 to a firm anchor point, such as the ground, which supports the entire device. Tension spring 156 opposes the upward force on control stop 136 by cable 158 resulting from the downward pull of weight 160 and pulls stop 136 downwardly to rest against lower limit stop 198 in the event cable 158 breaks and weight 160 falls to the ground. Since in such position, stop 198 no longer contacts protrusion 134, the device is prevented from normal rotational operation by backward pivoting of vane 130 and other associated vanes 132 in a manner hereinafter described. Cable 158 is supported by pulleys 162 mounted on loop 164 comprising a pair of spaced rail members which also support control rod 138 and support rods 166 for vanes 132 therebetween. It is to be noted that vanes 130 and 132 are free to pivot about support rods 166 in the direction shown in FIG. 22 in phantom and designated by the numerals 130' and 132', and will do so under the influence of a wind moving generally in a direction from top to bottom in FIG. 22. However, under the influence of a wind moving in the opposite direction, namely, from bottom to top in FIG. 22 or into the plane of FIG. 21, protrusion 134 engages control stop 136 in its upper position against limit stop 200, and vane 130 then presents a substantial area to the flow of wind, thereby generating a torque on the device and causing counterclockwise rotation of loop 164, as well as associated cable 158 and weight 160, causing rotation of the entire assembly, including shaft 146.

As is best seen in FIG. 25, the force of wind (or other fluid in motion) on vane 132 which drives protrusion 134 toward contact zone 135 of control stop 136 can force control stop 136 to pivot on rod 138 in opposition to tension exerted on stop 136 by spring 156. When sufficient wind speed is present to force stop 136 to the position shown in phantom in FIG. 25, protrusion 134 can clear contact zone 135 of stop 136, and vane 130 pivots on its associated support rod 166 under the influence of the wind to become aligned in the direction of the wind. Such backward pivoting releases the driving effect of vane 130 on framework 144 and in the manner herein shown, and vanes 132 are also released by pivoting on their associated support rods 166 when vane 130 is released. In the case of a wind motor, the governor system described can prevent damage during times of high winds, such as storms, allowing the device to weather out the storm. Spring 156 can be mounted at its lower extremity on a selected one of anchors 170, thereby permitting adjustment of the tension exerted on control stop 136. For example, when an anchor 170 is chosen nearer the axis of rotation, the tension on spring 156 is greater, thereby requiring a greater wind speed to overcome the torsion produced by spring 156 and force control stop 136 backward, and, accordingly, requiring a stronger wind speed to move stop 136 to the position at which vane 130 will cease to supply torque to cause rotation of the device. It is to be noted from FIG. 21 that associated vane 132 has a region of overlap 172 with vane 130, so that the back of vane 130 can be used as a stop to catch vane 132 and permit normal operation. However, when sufficient angular velocity is generated that vane 130 pivots backwardly on support rod 166 in the manner described above where protrusion 134 passes control stop 136, the region of overlap 172 is no longer present, and vane 132 also pivots backwardly, thereby releasing in sequence all other associated vanes 132 arranged in similar fashion with regions of overlap 172. In this manner, any number of vanes can be controlled. Details of the control stop and protrusion and the associated support rod and spring are shown in FIG. 25.

FIG. 23 shows a second form of the governor system of the present invention, constituting a vane 130 provided with protrusion 134, two additional associated vanes 132 having overlapping regions 172 which function in the same manner as described above for the first form of the invention. In addition, two impulse vanes 180 have overlapping region 182, impulse vanes 180 being independent in operation from vanes 130 and 132. Vanes 130 and 132 in the second form of governor system are linked together through regions of overlap 172 in the same manner as the first form, described above. Accordingly, even when the governor system of FIG. 23 operates to allow protrusion 134 to pass control stop 136, thereby preventing control vane 130 and associated vanes 132 from contributing the torque which causes the device to rotate in normal operation, impulse vanes 180 will cause the device to continue to rotate slowly, even in a hard wind. Nevertheless, in a hard wind, such as a potentially damaging storm, large vanes 130 and 132 can be inactivated to prevent damage to the device. The governor system of the second form of the invention shown in FIG. 23 differs in construction somewhat from that of the first form shown in FIG. 21, in that cable 184 in the second form passes through opening 186 in shaft 188 and emerges from lower opening 190 to swing freely outwardly therefrom. A plurality of vane systems can be connected to a single weight 160, without the possibility of interference with other components. Slidable mount 192 for spring 156 can be tightenably fastened to interior segment of loop 164 in order to adjust the tension of spring 156, as is shown in FIG. 23, and it is to be further understood that other arrangements, such as that shown in FIG. 21, can be used to provide for adjustment of the tension on spring 156. Tripod support 194 supports shaft 188, which turns on thrust bearing 196 and on cap 152, which is anchored by guy wires 154 in the same manner as described for the first form of the governor system.

While the two forms of the invention illustrated and described herein are restricted to relatively small units, larger units can also be controlled by governor systems utilizing the same concept. For example, the device shown in FIG. 17 mounted on a balloon can be controlled by a radio operated vane stop system where a signal transmitted by radio to a balloon equipped with a suitable receiver could be used to actuate a solenoid or other suitable mechanical means to move a control stop, similar in nature to that of control stop 136, to prevent excessive wind speeds from damaging the system. Such radio controlled units could also be used with the system installed on tracks, as illustrated in FIGS. 18, 19 and 20, although the system of FIG. 21 or FIG. 23 could also be used with the system on tracks.

In addition, many mechanisms equivalent to that of spring 156 could be used, such as magnetic means, hydraulic means, and the like, it being understood that a spring is shown to establish the idea in the two forms of governor systems illustrated in FIGS. 21 and 23. Moreover, a weight is illustrated in the two forms shown, but a lever clutch system could be substituted to accomplish the same purpose. As yet a further alternative, an electromagnet controller or other similar device could be used to move control stop 136 up or down on control rod 138 as desired or needed.

It is to be noted from FIGS. 21 and 23 that the direction of rotation of the device can be changed by the simple expedient of placing protrusion 134 on the opposite side of control stop 136 for each vane assembly constituting the fluid current motor, thereby causing the direction of rotation to reverse.

A further observation from FIGS. 21 and 23, showing the two forms of governor system illustrated, concerns the space between shaft 146 or 188 and the nearest vane 130. The space therebetween should be clear so that vanes 130 and 132 will have an opportunity to become flat and offer resistance to the wind, thereby furnishing the torque needed to cause rotation in the normal operating mode. Moreover, the space between the central shaft and nearest vane 130 should be clear to allow installation of the governor system components, including spring 156, control stop 136, cable 158 or 184, and the like. Adjustable limit stops 198 and 200 on control rod 138 confine the degree of excursion of control stop 136 within desired limits. It should be further noted that adjustment of the speed at which the control system of either the first or second forms of the governor system will cause protrusion 134 to slip past control stop 136 can be effected by changing the tension of spring 156 either by increasing the stiffness of spring 156 or by extending spring 156 by adjustment of its mount on segment 193, as described above, thereby causing vane 130 to feather at a higher wind speed. Conversely, lesser tension will require a lesser wind speed to inactivate the principal vanes 130. Naturally, since spring 156 supplies both torsion to control stop 136 in opposition to the force of wind and tension to stop 136 in opposition to the force from cable 158 due to weight 160, both torsion and extension must be adjusted together.

EXAMPLE

Figure 3:
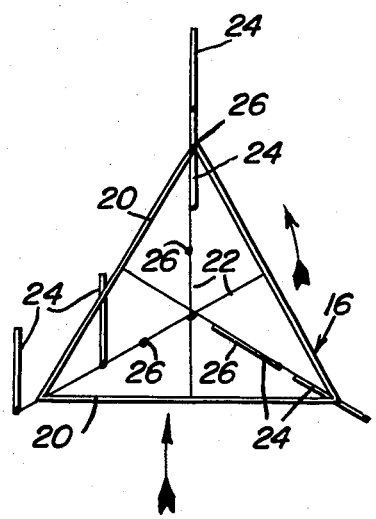
FIGS. 3-11 are schematic, top plan views showing the various stages in a cycle of operation of the motor shown in FIGS. 1 and 2.
Figure 4:
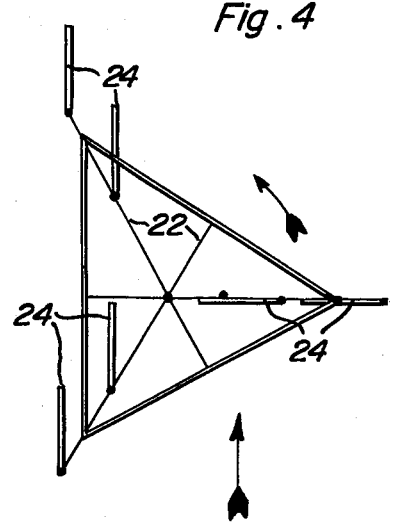
Figure 5:
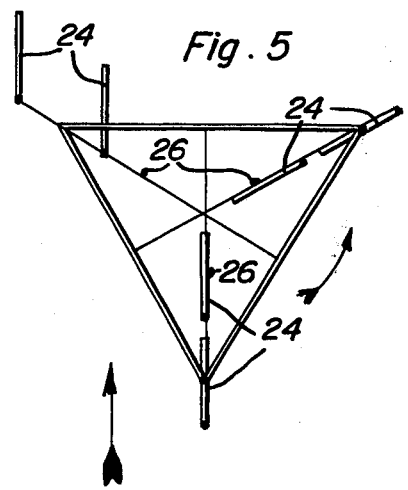
Figure 6:
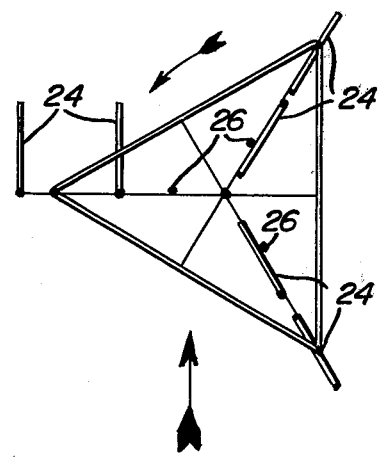
Figure 7:
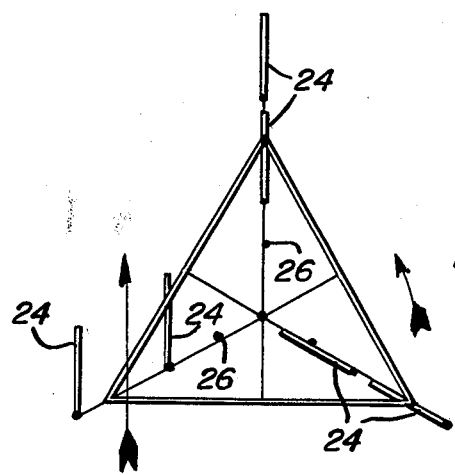
Figure 8:
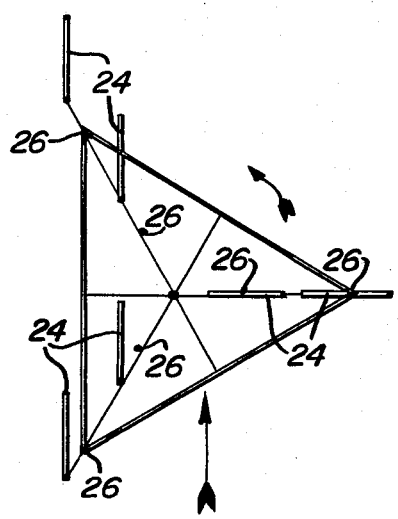
Figure 9:
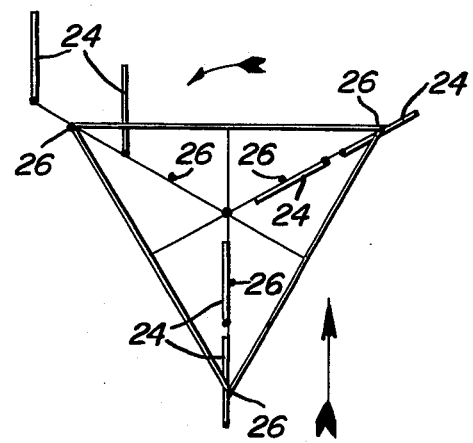
Figure 10:
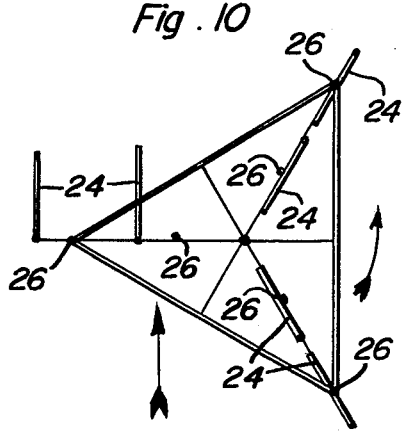
Figure 11:
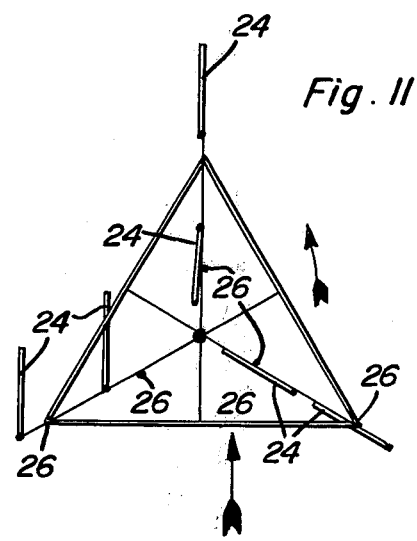

A triangular arrangement of vanes similar to that of FIG. 21, arranged generally as shown in FIG. 3, comprising one control vane 130 and three vanes 132, was constructed. The unit generated a moderate electrical power output at an angular velocity of 18 revolutions per minute in a steady wind measured at 10 miles per hour. The unit rotated at an angular velocity of 22 revolutions per minute in a 40 mile per hour wind, generating a substantially greater electrical power output than under the 10 mile per hour wind, at which time the governor system caused inactivation in the manner described above for the first form of the governor system of the invention.

Inasmuch as wind speeds in excess of 40 miles per hour can occur frequently, particularly in storms, during which storm damage to the device or electrical power generator might be expected, the governor system proved to be useful for protecting the constructed device in such adverse weather circumstances.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fluid current motor, comprising, in combination; vane means supported for rotation about a central axis, support means mounting the vane means for said rotation in the fluid current in order to translate the fluid current into useful mechanical or electrical energy, said vane means comprising at least one pair of parallel spaced frame members and at least one flapper pivotally mounted between the frame members, said vane means further including stop means provided between said frame members for limiting pivotal movement of said flapper when the flapper is moving with the fluid current, while permitting the flapper to swing parallel to a direction of flow of the fluid current when the flapper is moing against the direction of flow of the fluid current, a governor system to limit the rotation of said vane means in the fluid current, said governor system including a control stop pivotally mounted on control support means extending between said frame members and being capable of pivotal movement on said control support by direct contact with said fluid current so as to respond to the speed of said fluid current, said control stop being engageable with said flapper whenever the fluid current speed is below a predetermined limit and disengageable from said flapper when the speed of said fluid current exceeds the predetermined limit whereby the rotational movement of said vane is severely limited, said governor system further including an adjustable tension means for maintaining said control stop engageable with said flapper whenever the current speed is below a predetermined limit, said adjustable tension means being secured to said control stop and extending to one of said frame members, said tension means being mounted for movement along said one frame member to adjust the response of said control stop to said fluid current speed, said tension means being a spring tension means in which the response of said control stop can be controlled by the tension of said spring, the tension of said spring being responsive to the distance between said control support means and the point wherein said spring is mounted to said one frame member.

2. The fluid current motor of claim 1 wherein said central axis is a rotatable shaft which has attached thereto said frame members and is rotatable with the rotation of said vane means.

3. The fluid current motor of claim 1 wherein said central axis is a vertical axis and said fluid current motor includes a track means horizontally encircling said vertical axis, said vane means being movable along said track means.

4. The fluid current motor of claim 3 wherein said track means includes an inner track and an outer track and said vane means includes a first vane means and a second vane means, said first and second vane means being interconnected and being movable in said inner track means and said outer track means, respectively.

5. The fluid current motor of claim 3 wherein said track means is placed about the exterior surface of an inflatable balloon.

6. The fluid current motor of claim 4 wherein said track means has incorporated therein linear generating means to produce an electrical current during the rotation of said vane means.

7. The fluid current motor of claim 4 wherein said track means includes linear generating means to produce an electrical current during the rotation of said vane means.

8. The governor system of claim 1 further including a biasing means connected to said control stop and exerting a force against said spring to maintain said control stop in position to contact said flapper when said fluid current speed is below said predetermined limit, said biasing means comprising a cable, a weight and at least one pulley mounted on the vane means, the cable being suspended from the pulley and the cable being attached at one end to the weight and upwardly pullingly attached at the opposite end to the control stop, in opposition to downwardly spring biased tension, the control stop being slidably fastenable on said control support and having a pair of limit stops attached thereto to allow upward slidable movement of the control stop on the control support to an upper position defined by an upper limit stop and to allow downward slidable movement under the spring biased tension of the control stop on the control support to a lower position defined by a lower limit stop, the flapper including a protrusion which contacts the control stop in the upper position and which passes the control stop in the lower position, whereby damage to the fluid current motor is prevented upon detachment of the weight from the cable by sliding of the control stop under the downward spring biased tension from the upper position to the lower position.

9. The governor system of claim 8 wherein said vane means comprises a framework encompassing a plurality of vane assemblies, each vane assembly comprising said pair of framework members and a pivotal mounted control flapper having a protrusion for disconnectably engaging the control stop, each vane assembly further including one or more associated flappers each having a region of overlap with the control flapper or another associated flapper, such that the action of the protrusion on the control stop creates said rotation when the control stop is in the upper position, said protrusion and control flapper being disconnectable from said control stop when the speed of said fluid current acting on said control stop exceeds a predetermined limit.

10. The governor system of claim 9 wherein said associated flappers are sequentially linkable in relation to the control flapper such that said region of overlap with the control flapper disconnectably engages the control flapper and other associated flappers, the linkage between the control flapper and first associated flapper being disconnectable when the control flapper is disconnected from the control stop.

11. The governor system of claim 10 wherein each vane assembly includes a plurality of associated flappers comprising a first associated flapper disconnectably linkable by a first region of overlap with said control flapper, the other associated flapper or flappers being sequentially disconnectably linkable with the first associated flapper by respective regions of overlap such that the associated flappers are sequentially disconnectable when the control flapper is disconnected from the control stop.

12. The governor system of claim 11 wherein said associate flappers are three in number.

13. The governor system of claim 10 wherein at least one of said vane assemblies includes at least one impulse flapper drivingly engageable with the vane assembly independently of the control flapper and the associated flapper or flappers.

* * * * *